(12) United States Patent
Sato et al.

(10) Patent No.: US 7,919,149 B2
(45) Date of Patent: Apr. 5, 2011

(54) CARBODIIMIDE COMPOUND AND WATERBORNE CURABLE RESIN COMPOSITION CONTAINING THEREOF

(75) Inventors: Koichi Sato, Osaka (JP); Yutaka Harada, Osaka (JP); Takehito Sasaoka, Osaka (JP)

(73) Assignee: Nippon Paint Co., Ltd., Osaka (JP)

( * ) Notice: Subject to any disclaimer, the term of this patent is extended or adjusted under 35 U.S.C. 154(b) by 356 days.

(21) Appl. No.: 12/085,360

(22) PCT Filed: Nov. 17, 2006

(86) PCT No.: PCT/JP2006/323516
§ 371 (c)(1),
(2), (4) Date: Aug. 8, 2008

(87) PCT Pub. No.: WO2007/061081
PCT Pub. Date: May 31, 2007

(65) Prior Publication Data
US 2009/0171016 A1 Jul. 2, 2009

(30) Foreign Application Priority Data

Nov. 22, 2005 (JP) .................................. 2005-337863

(51) Int. Cl.
*B05D 7/24* (2006.01)
*C08C 19/22* (2006.01)
*C08L 77/00* (2006.01)
*C07C 267/00* (2006.01)

(52) U.S. Cl. ..................... 427/407.1; 524/591; 525/375; 564/252

(58) Field of Classification Search .................. 524/591, 524/608; 564/252; 427/407.1; 525/375
See application file for complete search history.

(56) References Cited

U.S. PATENT DOCUMENTS

| 6,194,498 B1 | 2/2001 | Anderson et al. |
| 6,248,819 B1 * | 6/2001 | Masuda et al. ................. 524/195 |
| 6,730,807 B1 | 5/2004 | Häberle et al. |
| 2003/0091843 A1 | 5/2003 | Murschall et al. |
| 2006/0121204 A1 | 6/2006 | Nakae et al. |

FOREIGN PATENT DOCUMENTS

| DE | 199 54 500 | 5/2001 |
| EP | 0 780 440 | 6/1997 |
| EP | 1 297 948 | 4/2003 |
| JP | 2001-11151 | 1/2001 |
| JP | 2003-306476 | 10/2003 |
| WO | 2005/075587 | 8/2005 |

OTHER PUBLICATIONS

International Search Report issued Jan. 23, 2007 in the International (PCT) Application PCT/JP2006/323516 of which the present application is the U.S. National Stage.

* cited by examiner

*Primary Examiner* — Tae H Yoon
(74) *Attorney, Agent, or Firm* — Wenderoth, Lind & Ponack, L.L.P.

(57) ABSTRACT

It is the purpose of the present invention to provide a carbodiimide compound exhibiting superior water resistance and having good storage stability when it is applied to a waterborne coating composition, and a waterborne curable resin composition comprising thereof, and the carbodiimide compound of the present invention is represented by the following general formula (1):

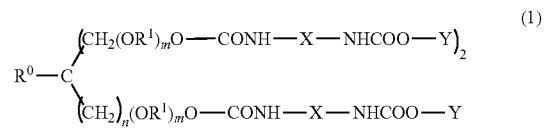

wherein X represents a bifunctional organic group containing at least one carbodiimide group, Y represents a structure in which a hydroxyl group is eliminated from a polyalkylene glycol monoalkyl ether, $R^0$ represents hydrogen or an alkyl group having 2 or less carbon atoms, $R^1$ represents an alkylene group having 4 or less carbon atoms, n represents 0 or 1 and m represents an integer of 11 or more, and wherein the repeating number of oxyalkylene group in the polyalkylene glycol monoalkyl ether is 6 to 40.

20 Claims, No Drawings

US 7,919,149 B2

CARBODIIMIDE COMPOUND AND WATERBORNE CURABLE RESIN COMPOSITION CONTAINING THEREOF

TECHNICAL FIELD

The present invention relates to a carbodiimide compound and a waterborne curable resin composition containing thereof.

BACKGROUND OF THE INVENTION

Recently, a waterborne coating composition has been widely used in place of the solvent type coating composition when articles made of metal such as outer panels and parts of vehicles such as automobiles and two-wheel vehicles are coated. Although there is a demerit that the waterborne coating composition is generally inferior in water resistance in comparison with the solvent type coating composition, for example, a coating composition containing a waterborne curable resin composition containing a carbodiimide compound is proposed for improved water resistance of the waterborne coating composition (for example, JP-A-2001-11151).

JP-A-2003-306476 discloses a carbodiimide compound and a waterborne curable resin composition containing thereof with a purpose of further improved water resistance. According to JP-A-2003-306476, curing at comparatively low temperature can be carried out by adding a carbodiimide compound to a coating composition, and a coating composition superior in properties such as water resistance can be obtained.

SUMMARY OF THE INVENTION

However, the conventional carbodiimide compound disclosed in JP-A-2003-306476 has high hydrophilicity and such compound is easily reacted with a carboxylic group at comparatively low temperature. When the reaction of the carbodiimide compound with the carboxylic group proceeds easily, problems that viscosity of the coating composition is raised and the like occur and the storage stability of the coating composition is lowered. Accordingly, when the conventional carbodiimide compound disclosed in JP-A-2003-306476 is added to the coating composition, the storage stability of the coating composition is occasionally lowered depending on its addition amount.

Consequently, it is the purpose of the present invention to provide a carbodiimide compound exhibiting superior water resistance and having good storage stability when it is applied to a waterborne coating composition, and a waterborne curable resin composition containing thereof.

The present invention is a carbodiimide compound represented by the following general formula (1):

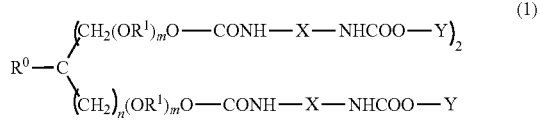

(1)

wherein X represents a bifunctional organic group containing at least one carbodiimide group, Y represents a structure in which a hydroxyl group is eliminated from a polyalkylene glycol monoalkyl ether, $R^0$ represents hydrogen or an alkyl group having 2 or less carbon atoms, $R^1$ represents an alkylene group having 4 or less carbon atoms, n represents 0 or 1 and m represents an integer of 11 or more, and wherein the repeating number of oxyalkylene group in the polyalkylene glycol monoalkyl ether is 6 to 40.

Further, the present invention relates to a waterborne curable resin composition comprising the carbodiimide compound and a resin having a carboxyl group.

Preferably, the resin may further have a hydroxyl group.

Further, the waterborne curable resin composition may contain a melamine resin, an isocyanate resin and/or an oxazoline compound as a curing agent. Preferably, it may contain a melamine resin as the curing agent.

Further, the resin having a carboxyl group may be at least one resin selected from the group consisting of a waterborne polyurethane resin, a waterborne polyepoxy resin, a waterborne polyester resin and a waterborne acryl resin.

Further, the curing agent is a melamine resin having a methoxy group and a butoxy group, the ratio of the methoxy group to the butoxy group (methoxy group/butoxy group) is 70/30 to 0/100, and the compatibility of the melamine resin with water may be 10 mL/g or less.

Herein, the HLB (i.e. proportion of hydrophilic portion to hydrophobic portion) of the carbodiimide compound may preferably be 2.0 to 6.3. More preferably, among the oxyalkylene groups which are contained in $OR^1$ group and Y, the number of carbon atoms in one group may be 1 or 2 and the number of carbon atoms in another group may be 3 or 4.

Further, the present invention relates to a waterborne intermediate coating composition, which is used for a method comprising formation of a multilayer coating film by simultaneously curing by heating an intermediate coating film, a waterborne base coating film and a clear coating film which have been formed on an article, in the order, by wet-on-wet and which are uncured, and which comprises the above waterborne curable resin composition.

According to the present invention, the carbodiimide compound in which the proportion of hydrophilic portion to hydrophobic portion (i.e. HLB) is suitably adjusted, and the waterborne curable resin composition containing thereof are provided. Thereby, when it is applied to a waterborne coating composition, superior water resistance can be exhibited and good storage stability can be obtained. Further, in the present specification, the hydrophilic portion corresponds to at least one of $OR^1$ group and Y in the general formula (1). When $OR^1$ group corresponds to the hydrophilic portion, the number of carbon atoms in $OR^1$ group is 1 or 2. When Y corresponds to the hydrophilic portion, the number of carbon atoms of the oxyalkylene group in Y is 1 or 2.

DETAILED DESCRIPTION OF THE PREFERRED EMBODIMENTS

The carbodiimide compound according to the present invention is represented by the following general formula (1):

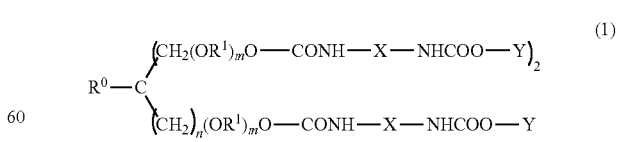

(1)

wherein X represents a bifunctional organic group containing at least one carbodiimide group, Y represents a structure in which a hydroxyl group is eliminated from a polyalkylene glycol monoalkyl ether (i.e. a polyalkylene glycol monoalkyl ether residue), $R^0$ represents hydrogen or an alkyl group having 2 or less carbon atoms, $R^1$ represents an alkylene group having 4 or less carbon atoms, n represents 0 or 1 and m represents an integer of 11 or more. In the carbodiimide compound, the repeating number of oxyalkylene group in the polyalkylene glycol monoalkyl ether is 6 to 40. Namely, in the formula, Y represents -(alkylene-O—)$_{6-40}$-alkyl group, wherein (alkylene-O—) moiety is occasionally referred to as "oxyalkylene group in Y". The carbodiimide compound can be preferably used as a curing agent for the waterborne coating composition due to the structure shown above.

$R^0$ represents hydrogen or an alkyl group having 2 or less carbon atoms. The alkyl group includes methyl group and ethyl group. $R^1$ represents an alkylene group having 4 or less carbon atoms (namely, 1 to 4 carbon atoms). The alkylene group includes a methylene group, an ethylene group, a propylene group, a butylene group and the like. $R^1$ may be the same or different. n represents 0 or 1. Further, in the general formula (1), the number of $OR^1$ group is defined by m. Since $OR^1$ group presents in the chain to extend its chain length and the degree of freedom is increased, the improvement of reactivity can be expected. m is preferably 11 or more. Further, m can be any value of 11 or more so far as dispersion to water can be carried out, and m is preferably 60 or less. m may be the same or different.

When the number of carbon atoms in $OR^1$ group is 1 or 2, diffusion to water becomes difficult when m is lower than 11. On the other hand, when m is larger than 60, there is fear that the hydrophilicity is further enhanced and the storage stability is lowered. When the number of carbon atoms in $OR^1$ group is 3 or 4, the hydrophilicity is enhanced and the storage stability is lowered when m is lower than 11. On the other hand, when m is larger than 60, there is fear that dispersion to water becomes difficult.

Further, the value of m in the general formula (1) means the average value of the numbers of $OR^1$ groups in respective chains.

The example of the oxyalkylene group in Y includes an oxyalkylene group having 1 to 4 carbon atoms, such as an oxymethylene group, an oxyethylene group, an oxypropylene group and an oxybutylene group, and 2 or more of these may be used. The repeating number of the oxyalkylene group is from an upper limit of 40 to a lower limit of 6. The upper limit is preferably 30 and the lower limit is preferably 9.

When the number of carbon atoms of the oxyalkylene group in Y is 1 or 2, the hydrophilicity is enhanced and the storage stability is lowered when the repeating number of the oxyalkylene group is larger than 40. On the other hand, when the repeating number of the oxyalkylene group is lower than 6, dispersion to water becomes difficult. When the number of carbon atoms of the oxyalkylene group in Y is 3 or 4, dispersion to water becomes difficult when the repeating number of the oxyalkylene group is larger than 40. On the other hand, when the repeating number of the oxyalkylene group is lower than 6, the hydrophilicity is enhanced and the storage stability is lowered.

The terminal alkyl group of Y (namely, the alkyl group in the monoalkyl ether moiety in Y) includes an alkyl group having 1 to 6 carbon atoms (for example, a methyl group, an ethyl group, a propyl group, an isopropyl group, a butyl group, an isobutyl group, a tert-butyl group, a pentyl group, an isopentyl group, a neopentyl group, a hexyl group and the like). Y may be the same or different.

X moiety in the general formula is a bifunctional (namely, divalent) organic group containing at least one carbodiimide group. The carbodiimide compound of the present invention has three (3) X moieties in one molecule. The X moiety may be the same or different. Since the carbodiimide compound has such three branched structure, curing at low temperature can be carried out. In the X moiety, a carbodiimide group and a divalent hydrocarbon group which is formed by a diisocyanate compound via elimination of two isocyanate groups exist alternately and the both terminals of X are preferably the divalent hydrocarbon groups. Further, the X moiety can be represented by the following general formula (2):

$$—(R^2—(N=C=N—R^2)_p)— \qquad (2)$$

In the general formula (2), each $R^2$ is preferably a divalent hydrocarbon group having 6 to 15 carbon atoms. The specific example of the group includes a phenylene group, a diphenylenemethylene group, a diphenylene(dimethyl)methylene group, a methylphenylene group, a dimethylphenylene group, a tetramethylxylylene group, a hexylene group, a cyclohexylene group, a dicyclohexylenemethylene group and the like. The dicyclohexylenemethylene group is preferable. p in the general formula (2) is 1 to 10. When p is large, since the number of the carbodiimide group present in the chain is increased, the improvement of curing property can be expected; therefore p is preferably 2 or more, and its upper limit is more preferably 8 or less.

The carbodiimide compound according to the present invention preferably has 2.0 to 6.3 of the proportion of hydrophilic portion to hydrophobic portion (HLB). HLB value can be determined by the Griffin formula (the equation (1) below) based on weight ratio.

$$HLB = 20 \times (MH/M) \qquad (1)$$

In the equation (1), MH represents molecular weight of the hydrophilic portion and M represents all molecular weight of the carbodiimide compound. When Y corresponds to the hydrophilic portion, namely, when the number of carbon atoms of the oxyalkylene group in Y is 1 or 2, the HLB is calculated, for the Y, using molecular weight of the oxyalkylene group only.

Among $OR^1$ group and the oxyalkylene group in Y, one preferably has 1 or 2 carbon atoms and another preferably had 3 or 4 carbon atoms. More preferably, the number of carbon atoms in $OR^1$ group is 3 or 4 and the number of carbon atoms of the oxyalkylene group in Y is 1 or 2. Further preferably, the number of the carbon atoms in $OR^1$ group is 3 and the number of carbon atoms of the oxyalkylene group in Y is 2. The dispersibility in water of the carbodiimide compound can be improved thereby.

Thus, when the carbodiimide compound is applied to a waterborne coating composition, superior water resistance can be exhibited and good storage stability can be obtained by suitably adjusting the proportion of hydrophilic portion to hydrophobic portion (HLB).

Production Process of Carbodiimide Compound

The carbodiimide compound according to the present invention can be produced, for example, by a production process comprising (A) a step of preparing a diisocyanate compound having at least one carbodiimide group in the molecule, (B) a step of reacting the diisocyanate compound with a polyalkylene glycol monoalkyl ether, and (C) a step of reacting the reaction product of the diisocyanate compound with the polyalkylene glycol monoalkyl ether with a trifunctional polyol.

In the step (A), a diisocyanate compound having at least one carbodiimide group in the molecule is prepared. The diisocyanate compound having at least one carbodiimide group in the molecule can be obtained by a condensation reaction of diisocyanate compound. Alternatively, the diisocyanate compound is commercially available as CARBODI- LITE series from Nisshinbo Industries Inc. Among the CARBODILITE series, V-01 is preferable.

When the diisocyanate compound having at least one carbodiimide group in the molecule is obtained by the condensation reaction of diisocyanate compound, the diisocyanate compound to be used is not specifically limited and the example of the compound includes aromatic diisocyanates such as 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, and tetramethylxylylene diisocyanate; aliphatic diisocyanates such as hexamethylene diisocyanate; alicyclic diisocyanate such as cyclohexane-1,4-diisocyanate, xylylene diisocyanates, isophorone diisocyanate, 4,4-dicyclohexylmethane diisocyanate and methylcyclohexane diisocyanate; and a mixture thereof, etc. The diisocyanate compound is more preferably 4,4-dicyclohexylmethane diisocyanate.

The condensation reaction can be carried out using a carbodiimidation catalyst. The carbodiimidation catalyst is not specifically limited, and the example of the catalyst includes phosphorene oxides such as 1-phenyl-2-phosphorene-1-oxide, 3-methyl-2-phosphorene-1-oxide, 1-ethyl-2-phosphorene-1-oxide, 3-methyl-1-phenyl-2-phosphorene-1-oxide and 3-phosphorene isomers thereof, etc. As the carbodiimidation catalyst, 3-methyl-1-phenyl-2-phosphorene-1-oxide is more preferable from the viewpoint of the reactivity.

In the step (B), the diisocyanate compound having at least one carbodiimide group in the molecule obtained in the step (A) is reacted with a polyalkylene glycol monoalkyl ether. Since the compound obtained in the above reaction is required to be further reacted with a trifunctional polyol at the next step (C), it is required that an isocyanate group is remained. Accordingly, it is necessary in the reaction that the equivalent of the isocyanate groups is higher than the equivalent of the hydroxyl groups, and an amount is preferable that the equivalent ratio of the isocyanate groups to the hydroxyl groups is preferably 2/1 (isocyanate group/hydroxyl group). The reaction can be carried out under the conditions usually known to those skilled in the art, and a tin catalyst can be used if necessary.

The polyalkylene glycol monoalkyl ether includes polyethylene glycol monoalkyl ether, polypropylene glycol monoalkyl ether and polybutylene glycol monoalkyl ether with repeating units of 6 to 40.

In the step (C), the reaction product obtained in the step (B) is reacted with a trifunctional polyol. The amount of the trifunctional polyol to be used is generally an amount that the equivalent of the hydroxyl groups is more than the isocyanate equivalent of the reaction product. The isocyanate equivalent is preferably equal to the equivalent of the hydroxyl groups. Further, the isocyanate equivalent of the reaction product can be also calculated from the formulation ratio of the diisocyanate compound to the polyalkylene glycol monoalkyl ether in the previous stage, other than direct measurement. The reaction can be carried out in a similar manner as previously described in the step (B). Thus, the carbodiimide compound according to the present invention can be obtained.

It is preferable from the viewpoint of easy availability that the trifunctional polyol is, for example, an alkylene oxide adduct such as trimethylol propane and glycerin. The alkylene oxide includes ethylene oxide, propylene oxide and the like. The alkylene oxide adduct of glycerin is commercially available as GP series from Sanyo Kasei Co., Ltd. The example of the GP series includes GP-250 and GP-3000.

Waterborne Curable Resin Composition Containing Carbodiimide Compound

The waterborne curable resin composition according to the present invention contains the above-mentioned carbodiimide compound and a resin having a carboxyl group (hereinafter, referred to as "carboxyl group-containing waterborne resin"). The state of the waterborne curable resin composition is not specifically limited and includes, for example, aqueous solution, emulsion, dispersion, etc. The waterborne curable resin composition preferably further has a hydroxyl group.

The acid value of the solid content of the carboxyl group-containing waterborne resin is preferably within a range from a lower limit of 2 mg KOH/g to an upper limit of 80 mg KOH/g. When the acid value of the solid content is lower than 2 mg KOH/g, there is fear that adequate physical properties of the resulting coating film is not obtained when the waterborne curable resin composition according to the present invention is applied to a coating composition, and when it exceeds 80 mg KOH/g, there is fear that the water resistance of the resulting coating film is lowered. Further, the hydroxyl group value of the carboxyl group-containing waterborne resin is preferably within a range from a lower limit of 10 to an upper limit of 120. When the hydroxyl group value is lower than 10, there is fear that adequate physical properties of the coating film is not obtained when the waterborne curable resin composition according to the present invention is applied to a coating composition, and when the hydroxyl group value exceeds 120, there is fear that the water resistance of the resulting coating film is lowered.

The equivalent of the carbodiimide compound which is contained in the waterborne curable resin composition according to the present invention is preferably 0.1 to 1.0 equivalent based on the acid value of the whole solid contents of the waterborne curable resin composition. When the equivalent of the carbodiimide compound to be added is lower than 0.1 equivalent, there is fear that adequate physical properties of the coating film is not obtained when the waterborne curable resin composition according to the present invention is applied to a coating composition. On the other hand, when the equivalent of the carbodiimide compound to be added exceeds 1.0 equivalent, further effects are not obtained.

Further, the number average molecular weight of the carboxyl group-containing waterborne resin is preferably 3000 or more. When the number average molecular weight is lower than 3000, there is fear that adequate physical properties of the coating film is not obtained when the waterborne curable resin composition according to the present invention is applied to a coating composition.

The carboxyl group-containing waterborne resin may be those obtained by being synthesized in an organic solvent and by neutralizing the carboxyl group with a basic compound to be dissolved in water, and may be those obtained as emulsion by carrying out emulsion polymerization in an aqueous medium. The carboxyl group-containing waterborne resin includes a waterborne acryl resin, a waterborne polyester resin, a waterborne polyurethane resin, a waterborne polyepoxy resin and the like.

The carboxyl group-containing waterborne acryl resin is not specifically limited and the example of the resin includes an acryl resin obtained by copolymerizing a monomer composition consisting of a radical polymerizable unsaturated monomer having a carboxyl group and other ethylenically unsaturated monomer, and the like.

The radical polymerizable unsaturated monomer having a carboxyl group is not specifically limited and the example of the monomer includes acrylic acid, methacrylic acid, maleic acid, phthalic acid and the like. The other ethylenically unsaturated monomer is not specifically limited and the example includes hydroxyl group-containing ethylenically unsaturated monomers such as 2-hydroxyethyl acrylate, 2-hydroxyethyl methacrylate, 4-hydroxybutyl acrylate, 4-hydroxybutyl methacrylate, and a reaction product thereof with a lactone; amide group-containing ethylenically unsaturated monomers such as (meth)acrylamides such as acrylamide, methacrylamide, N-isopropyl acrylamide, N-butyl acrylamide, N,N-dibutyl acrylamide or hydroxymethyl acrylamide, methoxymethyl acrylamide and butoxymethyl acrylamide; additionally, a functional ethylenically unsaturated monomers such as styrene, α-methylstyrene, acrylic acid esters (for example, methyl acrylate, ethyl acrylate, butyl acrylate and 2-ethylhexyl acrylate), methacrylic acid esters (for example, methyl methacrylate, ethyl methacrylate, butyl methacrylate, isobutyl methacrylate, tert-butyl methacrylate, 2-ethylhexyl methacrylate and lauryl methacrylate), etc. Two or more of other ethylenically unsaturated monomers may be used in combination.

The carboxyl group-containing waterborne polyester resin is those obtained by the ester bond forming reaction with an alcohol with an acid. The carboxyl group-containing waterborne polyester resin is those obtained by using a polyol, a poly carboxylic acid, a lactone, a hydroxy carboxyl acid or the like as a starting material. In the present specification, the polyester resin includes also a so-called alkyd resin.

The polyol is a compound having 2 or more of hydroxyl groups in one molecule. The polyol is not specifically limited and the example includes pentaerythritol as a tetra-functional starting material; triols such as trimethylolpropane and hexanetriol; diols such as propylene glycol, neopentyl glycol, butylene glycol, hexylene glycol, octylene glycol, 1,6-hexanediol, 1,8-octanediol, 1,9-nonanediol, 1,10-decanediol, 1,12-dodecanediol, 1,2-cyclohexanediol, 1,3-cyclohexanediol, 1,4-cyclohexanediol, hydrogenated bisphenol A, caprolactonediol and bishydroxyethyltaurine. 2 or more of alcohol components may be used in combination.

The poly carboxylic acid is a compound having 2 or more of carboxyl groups in one molecule. The poly carboxylic acid is not specifically limited and the example includes aromatic dicarboxylic acids such as phthalic acid and isophthalic acid; aliphatic dicarboxylic acids such as adipic acid, azelaic acid and tetrahydrophthalic acid; tricarboxylic acids such as trimellitic acid; saturated fatty acids such as stearic acid and lauric acid; unsaturated fatty acids such as oleic acid and myristic acid; natural oil and fat such as castor oil, palm oil and soy bean oil as well as long chain fatty acids such as a modified natural oil and/or fat, etc. 2 or more of poly carboxylic acid components may be used in combination simultaneously.

Lactone is a compound having a cyclic ester bond. Lactone is not specifically limited and the example includes ε-caprolactone, γ-caprolactone, δ-valerolactone, γ-butyrolactone and the like. Two or more of lactones may be used in combination simultaneously. The polyol and the poly carboxylic acid may be used in combination with the lactone.

The hydroxycarboxylic acid is a compound having a hydroxyl group and a carboxyl group in one molecule. The hydroxycarboxylic acid is not specifically limited and the example includes hydroxycarboxylic acids such as dimethylolpropionic acid, etc. 2 or more of hydroxycarboxylic acids may be used in combination simultaneously. The polyol, the poly carboxylic acid and the lactone may be used in combination with the hydroxycarboxylic acid.

When a polyester resin obtained from starting materials has hydroxyl groups, the carboxyl group-containing waterborne polyester resin may be those in which a portion or all of the hydroxyl groups are modified with an acid anhydride, such as phthalic anhydride, succinic anhydride, hexahydrophthalic anhydride and trimellitic anhydride, to carboxyl groups.

The carboxyl group-containing waterborne polyurethane resin is a resin obtained by a reaction of a diisocyanate compound with, for example, diol including various polyol components such as acryl, polyester, polyether and polycarbonate, which includes a resin having a urethane bond. Among the polyurethane resins, a carboxyl group-containing resin is preferably used, and the introduction of the carboxyl group includes modifying a portion or all of hydroxyl groups derived from starting material to carboxyl groups with an acid anhydride or the like, use of a compound having a hydroxyl group and a carboxyl group in one molecule as a diol component, etc. The diol having a carboxyl group is not specifically limited and includes, for example, dimethylol propionic acid and the like as preferable one.

The example of the diisocyanate compound includes 2,4-tolylene diisocyanate (2,4-TDI), 2,6-tolylene diisocyanate (2,6-TDI) and a mixture thereof (TDI), diphenylmethane-4,4'-diisocyanate (4,4'-MDI), diphenylmethane-2,4'-diisocyanate (2,4'-MDI) and a mixture thereof (MDI), naphthalene-1,5-diisocyanate (NDI), 3,3'-dimethyl-4,4'-biphenylenediisocyanate (TODI), xylylene diisocyanate (XDI), dicyclohexylmethane diisocyanate (hydrogenated HDI), isophorone diisocyanate (IPDI), hexamethylene diisocyanate (HDI), hydrogenated xylylene diisocyanate (HXDI) and the like.

The example of the carboxyl group-containing waterborne polyepoxy resin includes a resin having a resin skeleton obtained by reaction of bisphenol with epichlorohydrin, etc. Among the polyepoxy resins, a carboxyl group-containing resin is preferably used. The introduction method of the carboxyl group includes modifying a portion or all of hydroxyl groups derived from starting material to carboxyl groups with an acid anhydride, as well as use of a compound having a carboxyl group in a molecule as a starting material component. The bisphenol includes, for example, bisphenol A and F. The bisphenol also includes those whose chain has been extended with an appropriate chain extender, etc.

A basic compound that is used for dispersing or dissolving the carboxyl group-containing waterborne resin in water is not specifically limited and the example includes organic amines such as monomethylamine, dimethylamine, trimethylamine, triethylamine, diisopropylamine, monoethanolamine, diethanolamine and dimethylethanolamine; inorganic bases such as sodium hydroxide, potassium hydroxide and lithium hydroxide, etc. Neutralization ratio by the basic compound is not specifically limited, and it is not specifically limited so far as it can dissolve a waterborne resin in water. The neutralization ratio is usually 40 to 120% of the carboxyl group equivalent of the resin.

Further, the waterborne curable resin composition according to the present invention may contain other curing agent in combination, if necessary. The other curing agent is not specifically limited and the example includes other carbodiimide compounds other than the carbodiimide compound according to the present invention, oxazoline compounds, isocyanate resins, melamine resins and the like. One or two or more of these may be used in suitable combination.

The melamine resin is not specifically limited and those usually used as a curing agent can be used. For example, an alkyl-etherified melamine resin which has been alkyl-etherified is preferable. The melamine resin substituted by methoxy group and/or butoxy group is more preferable. Such melamine resin includes, as those having a methoxy group singly, CYMEL 325, CYMEL 327, CYMEL 370, MYCOAT 723; as those having both of a methoxy group and a butoxy group, CYMEL 202, CYMEL 204, CYMEL 211, CYMEL 232, CYMEL 235, CYMEL 236, CYMEL 238, CYMEL 254, CYMEL 266 and CYMEL 267 (either is Trade Name, manufactured by Nihon Cytec Industries Inc.); as those having a butoxy group singly, MYCOAT 506 (Trade Name, manufactured by Nihon Cytec Industries Inc.), U-VAN 20N60, U-VAN 20SE (either is Trade Name, manufactured by Mitsui Chemicals Inc.), SUPERBECKAMINE 13-548 (Trade Name, manufactured by Dainippon Ink and Chemicals Inc.), and the like. These may be used alone and 2 or more may be used in combination.

In particular, the other curing agent is preferably a melamine resin having a methoxy group and a butoxy group in which its ratio (methoxy group/butoxy group) is 70/30 to 0/100. When the melamine resin in which the ratio (methoxy group/butoxy group) is within the range is used, the water resistance of the resin film formed by the waterborne curable resin composition can be improved.

The isocyanate resin is a resin obtained by blocking a diisocyanate compound with a suitable blocking agent. The diisocyanate compound is not specifically limited so far as it is a compound having 2 or more of isocyanate groups in one molecule and the example includes aliphatic diisocyanates such as hexamethylene diisocyanate (HMDI) and trimethylhexamethylene diisocyanate (TMDI); alicyclic diisocyanates such as isophorone diisocyanate (IPDI); aromatic-aliphatic diisocyanates such as xylylene diisocyanate (XDI); aromatic diisocyanates such as tolylene diisocyanate (TDI) and 4,4-diphenylmethanediisocyanate (MDI); hydrogenated diisocyanates such as dimer acid diisocyanate (DDI), hydrogenated TDI (HTDI), hydrogenated XDI (H6XDI) and hydrogenated MDI (H12MDI); the adducts and nurates of diisocyanates above, etc. Further, one or two or more of these can be used in suitable combination.

The blocking agent which blocks the diisocyanate compound is not specifically limited and the example includes oximes such as methyl ethyl ketone oxime, acetoxime and cyclohexanone oxime; phenols such as m-cresol and xylenol; alcohols such as butanol, 2-ethylhexanol, cyclohexanol and ethylene glycol monoethyl ether; lactams such as $\epsilon$-caprolactam; diketones such as diethyl malonate and acetoacetic ester; mercaptanes such as thiophenol; ureas such as thiourea; imidazoles; carbamine acids, etc. Among these, oximes, phenols, alcohols, lactams and diketones are preferable.

The oxazoline compound is preferably a compound having 2 or more of 2-oxazoline groups and includes, for example, following oxazolines, oxazoline group-containing polymers and the like. One or two or more of these can be used in combination. The oxazoline compound can be obtained by using a method comprising heating an amido alcohol in the presence of a catalyst, dehydrating and cyclizing, a method comprising synthesizing from an alkanolamine and a nitrile, or a method comprising synthesizing from an alkanolamine and a carboxylic acid, etc.

The example of the oxazolines includes 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane)sulfide, bis-(2-oxazolinylnorbornane)sulfide, and the like. One or two or more of these can be used in suitable combination.

The oxazoline group-containing polymer is a polymer obtained by polymerizing an addition polymerizable oxazoline and at least one other polymerizable monomer if necessary. The example of the addition polymerizable oxazoline includes 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like. One or two or more of these can be used in suitable combination.

Among these, 2-isopropenyl-2-oxazoline is industrially available and preferable.

The amount of the addition polymerizable oxazoline to be used is not specifically limited, but is preferably 1% by mass or more in the oxazoline group-containing polymer. When the amount is less than 1% by mass, the degree of curing tends to be insufficient, and durability, water resistance and the like tend to be damaged.

The other polymerizable monomer is not specifically limited so far as it can be copolymerized with the addition polymerizable oxazoline and it is a monomer which is not reacted with the oxazoline group, and the example includes (meth) acrylic acid esters such as methyl(meth)acrylate, butyl(meth) acrylate, 2-ethylhexyl(meth)acrylate; unsaturated nitrites such as (meth)acrylonitrile; unsaturated amides such as (meth)acrylamide, N-methylol (meth)acrylamide; vinyl esters such as vinyl acetate and vinyl propionate; vinyl ethers such as methyl vinyl ether and ethyl vinyl ether; α-olefins such as ethylene and propylene; halogenated α,β-unsaturated monomers such as vinyl chloride, vinylidene chloride and vinyl fluoride; α,β-unsaturated aromatic monomers such as styrene and α-methylstyrene; and the like. One or two or more of these can be used in suitable combination.

The oxazoline group-containing polymer can be produced from addition polymerizable an oxazoline and at least one other polymerizable monomer if necessary, by a conventional known polymerization method, for example, suspension polymerization, solution polymerization, emulsion polymerization or the like. The supply forms of the oxazoline group-containing compound include organic solvent solution, aqueous solution, non aqueous dispersion, emulsion and the like, but they are not specifically limited to these forms.

As the carbodiimide compound, those produced by various methods can be used, but basically, those obtained by synthesizing isocyanate-terminal polycarbodiimide by condensation reaction accompanying decarboxylation of organic diisocyanate can be mentioned. More specifically, in the production of the polycarbodiimide compound, there can be preferably mentioned a hydrophilic modified carbodiimide compound that is obtained by a step of reacting a polycarbodiimide compound containing at least 2 of isocyanate groups in one molecule with a polyol having hydroxyl groups at terminals of the molecule at a ratio at which the molar amount of the isocyanate groups of the polycarbodiimide compound exceeds the molar amount of the hydroxyl groups of the polyol, and a step of reacting the reaction product obtained in the above step with a hydrophilic modifying agent having an active hydrogen and a hydrophilic portion.

The carbodiimide compound containing at least 2 of isocyanate groups in one molecule is not specifically limited. A carbodiimide compound having isocyanate groups at its both terminals is preferable from the viewpoint of reactivity. The production method of the carbodiimide compound having isocyanate groups at its both terminals is known to those skilled in the art and, for example, condensation reaction accompanying decarboxylation of organic diisocyanate can be utilized.

As one example, when the waterborne curable resin composition contains a waterborne dispersion type polyurethane composition, a waterborne dispersion type acryl resin and other curing agent, these contents are explained. Among the resin solid contents in the waterborne curable resin composition, the solid content of a waterborne dispersion type polyurethane composition is preferably 5 to 35% by mass, more preferably 5 to 30% by mass based on the total amount of the solid contents in the waterborne dispersion type polyurethane composition, the waterborne dispersion type acryl resin and the other curing agent. When the content of the waterborne dispersion type polyurethane composition is less than the range, the improvement effect of chipping resistance of the coating film that is obtained when the waterborne curable resin composition is applied to a coating composition is decreased. On the other hand, when it is contained exceeding the range, water resistance that is obtained when the waterborne curable resin composition is applied to a coating composition tends to be lowered. Either cannot occasionally exhibit the effects of the present invention. Further, the solid content of the waterborne dispersion type acryl resin is preferably 15 to 90% by mass, and further preferably 20 to 80% by mass based on the total amount of the solid contents in the waterborne dispersion type polyurethane composition, the waterborne dispersion type acryl resin and the curing agent. When the content of the waterborne dispersion type acryl resin is less than the range, the chipping resistance of the coating film that is obtained when the waterborne curable resin composition is applied to a coating composition tends to be lowered. On the other hand, when it is contained exceeding the range, the water resistance of the coating film that is obtained when the waterborne curable resin composition is applied to a coating composition tends to be lowered. Either cannot occasionally exhibit the effects of the present invention.

The waterborne curable resin composition according to the present invention may further contain an emulsion combined a curing agent and a polymer (hereinafter, referred to as a "complex emulsion" or a "curing agent combined emulsion"). In this case, according to the above-mentioned embodiments, the emulsion combined a curing agent and a polymer is further added to the waterborne dispersion type polyurethane composition, the waterborne dispersion type acryl resin and the other curing agent. The curing agent used for preparing the emulsion is referred to as a "combined curing agent" in order to discriminate the other curing agent from the curing agent used for preparing the emulsion.

The complex emulsion includes a curing agent combined emulsion that is obtained by emulsion-polymerizing a mixture of the ethylenically unsaturated monomers that are described in the above-mentioned carboxyl group-containing waterborne acryl resin, in the presence of the combined curing agent, which is a monomer mixture in which glass transition temperature is −30° C. to 30° C. and preferably −25° C. to 25° C., acid value is 5 to 15 mg KOH/g and a hydroxyl group value is 30 to 100 and preferably 35 to 90.

As the combined curing agent, a melamine resin, an isocyanate resin, an oxazoline compound, a carbodiimide compound, and the like can be employed in a similar manner as previously described in the other curing agent. Two or more of these can be also used in combination. Among these, a melamine resin having a methoxy group and a butoxy group, in which its ratio (methoxy group/butoxy group) is 70/30 to 0/100, is preferable. When the melamine resin in which the ratio (methoxy group/butoxy group) is within the range is used, the water resistance of the resin film formed by the waterborne curable resin composition can be more improved in comparison with a case of not adding the complex emulsion.

Further, the water compatibility of the melamine resin is preferably 10 mL/g or less. The water compatibility can be measured by the following procedures. Namely, 5 g of a sample (herein, a melamine resin) is weighted in a 200 mL beaker on an even direct reading balance, 5 g of isopropyl alcohol is added thereto and the mixture is dissolved by mixing. Then, titration is carried out with deionized water while stirring at 20° C., and when the No. 5 type of a printed article placed under the 200 mL beaker cannot be read from the upper portion of the beaker, it is referred to as an end point.

Further, the xylene compatibility of the melamine resin is preferably 100 mL/g or more. The xylene compatibility can be measured by the following procedures. Namely, 10 g of a sample (herein, a melamine resin) is weighted in a 200 mL beaker on an even direct reading balance, titration is carried out with xylene while stirring at 25° C., and when the No. 5 type of a printed article placed under the 200 mL beaker cannot be read from the upper portion of the beaker, it is referred to as an end point.

The combined curing agent is preferably added by 10 to 30% by mass, and further preferably by 20 to 25% by mass based on the total solid mass of the curing agent combined emulsion to be produced.

The curing agent combined emulsion can be obtained by selecting the kinds and contents of respective ethylenically unsaturated monomers so that the glass transition temperature of the mixture of the respective monomer components is −30° C. to 30° C., acid value is 5 to 15 mg KOH/g and hydroxyl group value is 30 to 100, and by polymerizing the selected ethylenically unsaturated monomers according to conventional emulsion copolymerization method.

Further, emulsion copolymerization is also preferably carried out by combining polymerizable monomer(s) containing at least two radically polymerizable unsaturated groups in the molecule in addition to the ethylenically unsaturated monomers.

When the curing agent combined emulsion is contained in the waterborne curable resin composition of the present invention, its content is preferably 5 to 70% by mass, and further preferably 10 to 60% by mass based on the total amount of the resin solid content (for example, the solid contents of the waterborne dispersion type polyurethane composition, the waterborne dispersion type acryl resin, the other curing agent and the curing agent combined emulsion) of the waterborne curable resin composition. When the content of the curing agent combined emulsion is within the range, water resistance and chipping resistance are good.

Further, the waterborne curable resin composition according to the present invention can contain usually employed various additives such as a surface adjuster, a defoaming agent, a plasticizer, a film forming aid and an organic solvent in addition to the above-mentioned components.

Production Method of Waterborne Curable Resin Composition

Herein, the production method of the waterborne curable resin composition according to the present invention is described. The production method of the waterborne curable resin composition is not specifically limited, but, which includes, for example, a method including mixing the carboxyl group-containing waterborne resin with various additives (for example, curing agent and the like) and finally adding the carbodiimide compound. Further, when other curing agent in addition to the present carbodiimide compound is used in combination, a method including firstly mixing with the carboxyl group-containing waterborne resin can be employed.

Waterborne Coating Composition Containing Waterborne Curable Resin Composition

Herein, a case that the waterborne curable resin composition according to the present invention is applied to a coating composition is described. When a waterborne coating composition prepared by using the waterborne curable resin composition according to the present invention is used, as the carboxyl group-containing waterborne resin, preferably the emulsion of the carboxyl group-containing waterborne acryl resin and the dispersion of the carboxyl group-containing waterborne urethane resin may be used in combination. When these components are used in combination, the formulation ratio of the carboxyl group-containing waterborne acryl resin to the carboxyl group-containing waterborne urethane resin is preferably 80/20 to 20/80 (acryl resin/urethane resin) by the mass ratio of the resin solid contents, and it is further preferable that the upper limit is 70/30 and the lower limit is 50/50.

The waterborne coating composition may also contain pigment(s) such as a coloring pigment and a brightness pigment in addition to the carbodiimide compound and the carboxyl group-containing waterborne resin component(s). The coloring pigment is not specifically limited and the example includes various organic and inorganic coloring pigments, a filler pigment and the like. The example of the organic coloring pigment includes an azo lake pigment, an insoluble azo pigment, a condensed azo pigment, a phthalocyanine pigment, an indigo pigment, a perinone pigment, a perylene pigment, a dioxazine pigment, a quinacridone pigment, an isoindolinone pigment, a diketopyrrolopyrrole pigment, a benzimidazolone pigment, a metal complex pigment and the like. The example of the inorganic coloring pigment includes chrome yellow, yellow oxide, iron oxide red, carbon black, titanium dioxide and the like. The filler pigment includes calcium carbonate, barium sulfate, clay, talc and the like. The brightness pigment includes colored and non-colored metallic luster color pigments such as metals such as aluminum, copper, zinc, iron, nickel, tin and aluminum and alloys thereof, and a mixture thereof, and an interfering mica pigment, a white mica pigment, a graphite pigment, other colored flat pigments, and the like. When pigment is formulated, the pigment is preferably contained at the ratio of pigment/resin solid contents of 1/1 to 1/100.

The waterborne coating composition may be a waterborne intermediate coating composition. The waterborne intermediate coating composition can be used for a multilayer coating film forming method comprising simultaneously curing by heating an intermediate coating film, a waterborne base coating film and a clear coating film which have been formed, in the order, by wet-on-wet on an article and which are uncured. Herein, the "uncured" is a state before the coating films are perfectly cured by heating after their applications, and includes, for example, a state after preheating. The preheating is a step of leaving alone or heating, for example, under temperature conditions of room temperature to 100° C. or less for 1 to 10 minutes after their applications.

The multilayer coating film forming method includes, for example, (1) a step of applying the present coating composition on an article to form an intermediate coating film, (2) a step of applying a waterborne base coating composition and a clear coating composition on the intermediate coating film by wet-on-wet, in the order, without perfectly curing the intermediate coating film, to form a waterborne base coating film and a clear coating film, and (3) a step of simultaneously curing by heating the intermediate coating film, the waterborne base coating film and the clear coating film that have been formed by the steps (1) and (2).

Herein, the base coating film and the clear coating film can be formed by applying a waterborne base coating composition and a clear coating composition on the uncured intermediate coating film by wet-on-wet in the order. Alternatively, the multilayer coating film obtained as described above can also be formed by carrying out so-called 3 coat 1 bake, which simultaneously cures these three coating films. In this case, since a baking and drying furnace for the intermediate coating film can be abbreviated, it is also preferable from the viewpoint of economy and environment. Further, a drying step such as preheating is preferably adopted after applying a waterborne intermediate coating composition and a waterborne base coating composition respectively.

The article includes, conventionally, a metal, a plastic, a foam and the like. The example of metal includes chemical metal elements such as iron, copper, aluminum, tin and zinc and alloys including these chemical metal elements. Specifically, the embodiments of the bodies and parts of the automobiles such as a passenger car, an autotruck, an autobicycle and a bus can be assumed. The plastic substrate includes the products of a polypropylene resin, a polycarbonate resin, a urethane resin, a polyester resin, a polystyrene resin, an ABS resin, a vinyl chloride resin and a polyamide resin, etc. For example, automobile parts such as a spoiler, a bumper, a mirror cover, a grill and a door knob, and the like can be mentioned. A chemical film, an electrodeposition coating film and/or a primer coating film may be optionally applied on the substrate, and an intermediate coating film and a top coating film are formed thereon in this order.

As described above, the carbodiimide compound according to the present invention is not perfectly dissolved in water by adjusting the proportion of hydrophilic portion to hydrophobic portion (HLB), and can be prepared as a water dispersion type compound that is dispersed in water. Thereby, the carbodiimide group can be protected and reaction with a carboxyl group can be suppressed. Consequently, when the waterborne curable resin composition containing the carbodiimide compound according to the present invention is applied to a coating composition, the coating composition that exhibits adequate water resistance and shows good storage stability can be obtained.

Reactivity in water is suppressed for the carbodiimide compound according to the present invention. Curing reaction can easily proceed by the hydrophobic property of the coating film caused by evaporation of water.

Consequently, the stability and reactivity of the coating composition are compatible.

Further, the carbodiimide compound according to the present invention is in a water dispersion type that is not perfectly dissolved in water. Accordingly, viscosity of the coating composition can be set at low level in comparison with a conventional carbodiimide compound with high hydrophilicity. Accordingly, the coating composition having high non volatile content can be obtained.

Furthermore, according to the waterborne curable resin composition containing the carbodiimide compound of the present invention, superior curing property can be obtained, and even when a coating film is formed, the quantity of carboxyl groups remaining in the film can be reduced. Thereby, good solvent resistance can be maintained without being inferior in the solvent resistance in comparison with a waterborne curable resin composition containing a conventional carbodiimide compound.

Finally, the good appearance of the resulting coating film can be obtained by applying the carbodiimide compound according to the present invention to a coating composition. The reasons are explained as below. Partially, the carbodiimide compound starts curing reaction during the preheating of the coating film due to the addition of the carbodiimide compound according to the present invention to a coating composition. When the carbodiimide compound is applied to, for example, a waterborne intermediate coating composition, viscosity of the coating film after preheating is maintained at a certain level or more; therefore when a top coating composition is applied on the resulting coating film, it can be prevented solvent and low molecular weight components contained in the top coating composition from transferring to the coating film after the preheating. Furthermore, since the curing reaction during heating the carbodiimide compound according to the present invention proceeds faster than the reaction of melamine/hydroxyl group, time required for the curing of the waterborne intermediate coating composition can be shortened. Consequently, since the waterborne intermediate coating composition can be cured faster than the top coating composition, the volume shrinkage of the intermediate coating film does not affect on the top coating film. Accordingly, the good appearance of the coating film can be obtained.

As described above, when the waterborne curable resin composition containing the carbodiimide compound according to the present invention is applied to a coating composition, the coating film formed by the present coating composition has the good coating appearance and water resistance.

The waterborne curable resin composition further contains preferably a curing agent in addition to the carbodiimide compound. Thus, when the waterborne curable resin composition is applied to a coating composition, preferable chipping resistance can be obtained. The waterborne curable resin composition contains more preferably other curing agent and a carboxyl group-containing waterborne polyurethane resin. Elasticity is improved by adding both of the other curing agent and the carboxyl group-containing waterborne polyurethane resin to the waterborne curable resin composition. Accordingly, chipping resistance can be further improved. It is also preferable that the curing agent is a melamine-resin.

Although only some exemplary embodiments of the present invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

EXAMPLES

Examples of the present invention are described below, but the present invention is not limited to these Examples. Herein, "part(s)" is "part(s) by mass" unless otherwise specifically noticed.

Example 1

Production of Carbodiimide Compound A-1

3930 parts of 4,4-dicyclohexylmethane diisocyanate was reacted together with 79 parts of 3-methyl-1-phenyl-2-phosphoren-1-oxide which is a carbodiimidation catalyst at 180° C. for 16 hours to obtain a carbodiimide compound having 4 carbodiimide groups in the molecule and having isocyanate groups at both ends. Thereto, 1296 parts of polyethylene glycol monomethyl ether in which the repeating unit of oxyethylene group is 9 in average and 2 parts of dibutyltin dilaurate were added and the mixture was heated at 90° C. for 2 hours to obtain a carbodiimide compound having an isocyanate group and a hydrophilic group at terminals. Then, 3000 parts of GP-3000 (manufactured by Sanyo Kasei Co., Ltd.) having a structure in which 16.7 mol of propylene oxide corresponding to an $OR^1$ group was added to the three hydroxyl groups of glycerin in average was added and the mixture was reacted at 90° C. for 6 hours. It was confirmed by IR that an isocyanate group was disappeared for the reaction product. Thereto, 18800 parts of deionized water was added and the mixture was stirred to obtain the water dispersion of a carbodiimide compound having a resin solid content of 30% by mass. The formulation of the prepared carbodiimide compound A-1 is shown in Table 1.

TABLE 1

| | | Carbodiimide compound | | | | |
|---|---|---|---|---|---|---|
| | | Example 1 A-1 | Example 2 A-2 | Example 3 A-3 | Comparative Example 1 A-4 | Comparative Example 2 A-5 |
| Formulation of composition | 4,4-Dicyclohexylmethane-diisocyanate (parts) | 3,930 | 3,930 | 3,930 | 3,930 | 3,930 |
| | 3-Methyl-1-phenyl-2-phosphoren-1-oxide (parts) | 79 | 79 | 79 | 79 | 79 |
| | Polyethylene glycol monomethyl ether | | | | | |
| | Content (parts) | 1,296 | 888 | 5,376 | 492 | 2,079 |
| | Number of repeating unit of oxyethylene group | 9 | 6 | 40 | 3 | 15 |
| | Dibutyltin dilaurate (parts) | 2 | 2 | 2 | 2 | 2 |
| | Propylene oxide adduct of glycerin | | | | | |
| | Content (parts) | 3,000 | 2,000 | 10,000 | 3,000 | 250 |
| | Molar number of propylene oxide to be added | 16.7 | 11.0 | 56.9 | 16.7 | 0.9 |
| | Deionized water (parts) | 18,800 | 15,500 | 44,600 | 16,900 | 14,200 |
| Total (parts) | | 27,107 | 22,399 | 63,987 | 24,403 | 20,540 |

Water dispersibility and storage stability were evaluated for the carbodiimide compound A-1 obtained in Example 1.

Water Dispersibility

After leaving the water dispersion of the carbodiimide compound A-1 prepared in Example 1 at room temperature for one hour, its dispersion state was evaluated. Evaluation basis is as below.

◯: It is homogeneous state and sedimentation and aggregation were not confirmed.

x: Sedimentation and aggregation were confirmed.

Storage Stability

The residual rate of carbodiimide group was evaluated for the water dispersion of the carbodiimide compound just after preparation and the water dispersion of the carbodiimide compound after being stored at 50° C. for one week, using infrared absorption spectroscopy.

Firstly, the peak height nearby 2925 cm$^{-1}$ (the stretching vibration of C—H of methylene group) of the water dispersion of the carbodiimide compound just after preparation and the peak height nearby 2120 cm$^{-1}$ (the asymmetric stretching vibration of N═C of carbodiimide) were measured from the chart. Then, relative intensity (S0) was determined based on the equation (2) shown below using the measured values.

Relative intensity (S0)=peak height at 2120 cm$^{-1}$/peak height at 2925 cm$^{-1}$   (2)

Then, peak height was measured for the water dispersion of the carbodiimide compound after being stored at 50° C. for one week in a similar manner as described above and relative intensity (Sn) was determined.

The residual rate (Yn) of carbodiimide group was determined from the relative intensities respectively determined, based on the equation (3) shown below.

Residual rate (Yn)=Relative intensity (Sn)/Relative intensity (S0)×100   (3)

Evaluation basis is shown as below.

◯: The residual rate of carbodiimide group was 90% or more.

x: The residual rate of a carbodiimide group was less than 90%.

The results are shown in Table 2.

TABLE 2

|  |  | Carbodiimide compound | | | | |
| --- | --- | --- | --- | --- | --- | --- |
|  |  | Ex. 1 A-1 | Ex. 2 A-2 | Ex. 3 A-3 | Comp. Ex. 1 A-4 | Comp. Ex. 2 A-5 |
| Evaluation | NCN equivalent | 678 | 560 | 1,601 | 611 | 514 |
|  | HLB | 3.0 | 2.4 | 5.5 | 1.1 | 6.5 |
|  | Water dispersibility | ◯ | ◯ | ◯ | X | ◯ |
|  | Storage stability | ◯ | ◯ | ◯ | — | X |

In table 2, NCN equivalent means carbodiimide equivalent, which is calculated value from the content of the carbodiimide compound (see Table 1). HLB is also calculated value from the content of the carbodiimide compound (see Table 1)

Furthermore, in Table 2, "-" means that accurate data for storage stability of the resulted carbodiimide compound A-4 in Comparative Example 1 could not obtained, since its water dispersibility was poor.

Examples 2 and 3 and Comparative Examples 1 and 2

Production of Carbodiimide Compounds A-2 to A-5

The carbodiimide compounds A-2 to A-5 were produced by the similar procedure as Production Example 1 except that formulations were changed as shown in Table 1.

Examples 2 and 3

Water dispersibility and storage stability were evaluated for the carbodiimide compounds A-2 to A-3 obtained in Examples 2 and 3. Since the evaluation method and the evaluation basis are similar as Example 1, further description is abbreviated. The results are shown in Table 2 above.

Comparative Examples 1 and 2

Water dispersibility and storage stability were evaluated for the carbodiimide compounds A-4 to A-5 obtained in Comparative Examples 1 and 2. Since the evaluation method and the evaluation basis are similar as Example 1, further description is abbreviated. The results are shown in Table 2 above.

Production Example 1

Production of Water Dispersion Type Polyurethane Composition

Into a reaction flask, 0.26 part by mol of polycarbonatediol obtained from 1,6-hexanediol with number average molecular weight of 2000, 1.0 part by mol of isophorone diisocyanate and 0.36 part by mol of dimethylol propionate and 39% by weight of N-methyl-2-pyrrolidone based on the total amount of these were charged, the mixture was reacted at 125° C. for 2 hours under nitrogen flow, then 0.47 part by mol of triethylamine was added and the mixture was further stirred for one hour to obtain a prepolymer. Into 120 g of water in which 0.05 g of a silicone defoaming agent SE-21 (Trade name; manufactured by Wacker Silicone Inc.) was dissolved, 100 g of the above obtained prepolymer was added dropwise for 15 minutes. Then, 2.4 g of monoethanolamine was added thereto and the mixture was further stirred at 40° C. until absorption derived from an isocyanate group was disappeared by measurement using an infrared absorption spectroscopy to obtain a water dispersion type polyurethane composition with a non volatile content of 31.5% by mass. When the number average molecular weight of polyurethane dispersed in the water dispersion type polyurethane composition was measured by GPC analysis, it was 2200.

Further, the measurement conditions of number average molecular weight are as below.

Column: TSK gel G4000, G3000 and G2000.

Eluent: THF

Flow rate: 1000 mL/min.

Detection: UV (245 nm)

Standard substance: PST

Production Example 2

Production of Water Dispersion Type Acryl Resin

Into a reaction container for producing usual acryl resin emulsion, which is equipped with a stirrer, a thermometer, a dropping funnel, a reflux condenser, a nitrogen introducing tube and the like, 445 parts of deionized water and 5 parts of NYUCOLE 293 (Trade name; manufactured by Nippon Nyukazai Co., Ltd.) were charged and temperature was raised to 75° C. while stirring. A mixture of the following monomer mixed solution (acid value of solid contents: 10 mg KOH/g and hydroxyl group value of solid contents: 60), 240 parts of deionized water and 30 parts of NYUCOLE 293 was emulsified by a homogenizer. The monomer pre-emulsion emulsified by the homogenizer was added dropwise in the reaction container over 3 hours while stirring. Further, in parallel with the dropwise addition of the monomer pre-emulsion, an aqueous solution in which 1 part of APS (ammonium persulfate) as a polymerization inhibitor was dissolved in 50 parts of water was added dropwise into the reaction container until the completion of dropwise addition of the monomer pre-emulsion while keeping the rate of the dropwise addition at constant. After the completion of dropwise addition of the monomer pre-emulsion, the reaction was further continued at 80° C. for 1 hour and then, the mixture was cooled. After cooling, an aqueous solution in which 2 parts of dimethylaminoethanol was dissolved in 20 parts of water was added to obtain a waterborne resin emulsion with a non volatile content of 40.0% by mass. The resulted resin emulsion was adjusted to pH of 7.2 using an aqueous 30% dimethylaminoethanol solution.

| Formulation of monomer mixed solution | |
| --- | --- |
| Methyl methacrylate | 119 parts |
| Butyl acrylate | 231 parts |
| Styrene | 62 parts |
| 4-hydroxybutyl acrylate | 80 parts |
| Methacrylic acid | 8 parts |
| Ethylene glycol dimethacrylate | 20 parts |

Production Example 3

Production of Water-Soluble Acryl Resin

Into a reaction container, 23.9 parts of dipropylene glycol methyl ether and 16.1 parts of propylene glycol methyl ether were charged and temperature was raised to 120° C. while mixing and stirring under nitrogen flow. Then, a mixed solution of 54.5 parts of ethyl acrylate, 12.5 parts of methyl methacrylate, 14.7 parts of 2-hydroxyethyl acrylate, 10.0 parts of styrene and 8.5 parts of methacrylic acid, and an initiator solution consisting of 10.0 parts of dipropylene glycol methyl ether and 2.0 parts of t-butylperoxy-2-ethyl hexanoate were added dropwise respectively in the reaction container over 3 hours in parallel. After completion of the dropwise addition, aging was carried out at the same temperature for 0.5 hour.

Further, an initiator solution consisting of 5.0 parts of dipropylene glycol methyl ether and 0.3 part of t-butylperoxy-2-ethyl hexanoate was added dropwise in the reaction container over 0.5 hour. After completion of the dropwise addition, aging was carried out at the same temperature for 1 hour. Then, after 16.1 parts of the solvents were distilled off under reduced pressure (70 Torr) by a solvent removal apparatus at 110° C., 187.2 parts of deionized water and 8.8 parts of dimethylaminoethanol were added to obtain a water-soluble acryl resin with a non volatile content of 31% by mass, a number average molecular weight of 27000, acid value of solid contents: 56.2 mg KOH/g, hydroxyl group value of solid contents: 70 and a viscosity of 15000 mPa·s (measurement equipment; R type series 500 manufactured by TOKI SANGYO CO., LTD., a conical rotational viscometer, and the measurement conditions of cone of 1.34 degrees and 1 rpm/25° C.).

Production Example 4

Production of Coloring Pigment Paste

After 9.4 parts of a nonion-anion dispersant (Trade name; Disperbyk 190 manufactured by BIC Chemie Inc.), 36.8 parts of deionized water, 34.5 parts of rutile type titanium dioxide, 34.4 parts of barium sulfate and 6 parts of talc were preliminarily mixed, a glass beads medium was added in a paint conditioner and the mixture was dispersed by mixing at room temperature until particle size was 5 μm or less, to obtain a coloring pigment paste.

Production Example 5

Production of Curing Agent Combined Emulsion

Into a 10 L stainless beaker equipped with a stirrer (Trade name; T. K. ROBOMICS manufactured by TOKUSHU KIKA KOGYO Co., Ltd.), 1876 parts of deionized water, 400 parts of 20% aqueous solution of a reactive surfactant (Trade name; RAMTEL PD-104 manufactured by KAO Corporation) and 8 parts of Rongalit (sodium sulfoxylate-formaldehyde) were charged and the mixture was stirred until the Rongalit was dissolved. While stirring this at 2000 rpm, a homogeneous mixture of 80 parts of styrene, 227 parts of methyl methacrylate, 393 parts of methyl acrylate, 549 parts of ethyl acrylate, 246 parts of 4-hydroxybutyl acrylate, 24 parts of methacrylic acid, 80 parts of ethylene glycol dimethacrylate and 667 parts of a melamine resin (Trade Name; CYMEL 211, solid content=80% by mass, methoxy/butoxy ratio=65/35, water compatibility=8 ml/g, xylene compatibility>100 mL/g; manufactured by Nihon Cytec Industries Inc.) was gradually added to obtain the primary emulsion. This was emulsified at 12000 rpm for 20 minutes while cooling with ice water, and then an average particle diameter was measured (Trade name; ELS-800 manufactured by Otsuka Electronics Co., Ltd.). The average particle diameter of the resulted pre-emulsion was 154 nm.

Then, into a 5 L vertically long flask equipped with a stirrer, a thermometer, a cooling tube, a nitrogen gas introducing tube and a water bath, 758 parts of the pre-emulsion was charged and temperature was raised to 40° C. while stirring at 150 rpm. 15 Parts of an aqueous initiator solution, in which 80 parts of deionized water and 8 parts of 70% aqueous solution of t-butyl hydroxide (Trade Name, KAYABUTYL H-70 manufactured by KAYAKU Akzo Co., Ltd.) were mixed, were added to initiate the polymerization. After keeping temperature at 40° C. for 10 minutes, 3792 parts of the residual pre-emulsion and 73 parts of the initiator aqueous solution were added dropwise respectively over 3 hours in parallel. After completion of the dropwise addition of the pre-emulsion and the initiator aqueous solution, temperature was also kept at 40° C. for 2 hours. Thereto, 51 parts of 25% aqueous solution of DMEA (dimethylaminoethanol) was added dropwise over 30 minutes. After the completion of dropwise addition of the DMEA aqueous solution, temperature was also kept at 40° C. for 1 hour, and then, the mixture was cooled to room temperature, subjected to filtration with a 400 mesh filter and collected. The resulted non volatile content of the emulsion was 45.5% by mass, pH was 8.6 and an average particle diameter was 256 nm.

Example 4

Production of Waterborne Curable Resin Composition

After 12.5 parts (as a basis of the solid content) of a melamine resin (Trade Name; CYMEL 211, solid content=80% by mass, methoxy/butoxy ratio=65/35, water compatibility=8 ml/g, xylene compatibility>100 mL/g; manufactured by Nihon Cytec Industries Inc.) was mixed as a curing agent with 27.5 parts (as a basis of the solid content) of the water dispersion type acryl resin composition obtained in Production Example 2 and 5 parts (as a basis of the solid content) of the water-soluble acryl resin obtained in Production Example 3, 0.3 part (as a basis of the solid content) of an urethane association type thickener (Trade Name; ADEKANOL UH814N, manufactured by ADEKA Corporation) was mixed and stirred to obtain a waterborne curable resin composition. The resulted waterborne curable resin composition was diluted with deionized water to be adjusted to 36% by mass of the non volatile content (NV). The formulation of the waterborne curable resin composition was shown in Table 3.

composition after storage at 40° C. for 10 days was observed, and the storage stability was evaluated by comparing results of the observation with the observation results just after preparation. Evaluation basis is as follows.

○: Thickening and gelation were not observed in comparison with the waterborne curable resin composition just after preparation.

x: Thickening and gelation were observed in comparison with the waterborne curable resin composition just after preparation.

Water Resistance

A test piece was immersed in warm water at 40° C. for 10 days. Then, the appearance of the test piece rinsed for 1 hour was visually observed and evaluated according to the following basis. Further, if the evaluation result is ⊚ or ○, it is a level having no problem in practical use.

⊚: No change.

○: A portion immersed in warm water is slightly swollen but restores rapidly.

Δ: A portion immersed in warm water is slightly swollen but time is required for restoration.

x: A portion immersed in warm water is significantly swollen and very long time is required for restoration.

TABLE 3

| Contents | | Example 4 | Example 5 | Example 6 | Example 7 | Example 8 | Example 9 | Example 10 | Comparative Example 3 | Comparative Example 4 | Comparative Example 5 |
|---|---|---|---|---|---|---|---|---|---|---|---|
| Water dispersion type acryl resin | | 27.5 | 17.5 | — | — | 29.5 | 23.5 | 37 | 27.5 | 27.5 | 27.5 |
| Water-soluble acryl resin | | 5 | 5 | 5 | 5 | 5 | 5 | 6 | 5 | 5 | 5 |
| Curing agent combined emulsion | | — | — | 26.8 | 26.8 | — | — | — | — | — | — |
| Water dispersion type polyurethane composition | | — | 10 | 10 | 10 | — | — | — | — | — | — |
| Melamine resin | | 12.5 | 12.5 | 3.3 | — | 12.5 | 12.5 | — | 17.5 | 12.5 | 12.5 |
| Diisocyanate | | — | — | — | 3.3 | — | — | — | — | — | — |
| Urethane association type thickener | | 0.3 | 0.3 | 0.3 | 0.3 | 0.3 | 0.3 | 0.3 | 0.3 | 0.3 | 0.3 |
| Carbodiimide compound | A-1 | 5 | 5 | 5 | 5 | — | — | 7 | — | — | — |
| | A-2 | — | — | — | — | 3 | — | — | — | — | — |
| | A-3 | — | — | — | — | — | 9 | — | — | — | — |
| | A-4 | — | — | — | — | — | — | — | — | 5 | — |
| | A-5 | — | — | — | — | — | — | — | — | — | 5 |
| Total | | 50.3 | 50.3 | 50.4 | 50.4 | 50.3 | 50.3 | 50.3 | 50.3 | 50.3 | 50.3 |

Preparation of Test Piece

After the waterborne curable resin composition obtained in Example 4 was applied on a glass plate using a 6 mil doctor blade, it was dried at 100° C. for 30 minutes to prepare a test piece.

Evaluation of Waterborne Curable Resin Composition and Test Piece

Storage stability was evaluated for the above-prepared waterborne curable resin composition. Further, the water resistance and solvent resistance were evaluated using the above-prepared test piece.

Storage Stability

Firstly, the waterborne curable resin composition just after preparation was observed. Then, the waterborne curable resin Solvent Resistance Xylene was impregnated in gauze, it was rubbed 50 times while being pushed on the coating film face of a test piece, and then, the state of the coating film appearance was visually observed. Evaluation basis is as below. Further, if the evaluation result is "⊚" or "○", it is a level having no problem in practical use.

⊚: Peeling and blemish are not confirmed and there is no abnormality.

○: Peeling, blemish and the like are slightly confirmed but it is a level having no problem in practical use.

Δ: Peeling, blemish and the like are confirmed a little.

x: Remarkable peeling, blemish and the like are confirmed.

TABLE 4

| Evaluation items | Example 4 | Example 5 | Example 6 | Example 7 | Example 8 | Example 9 | Example 10 | Comparative Example 3 | Comparative Example 4 | Comparative Example 5 |
|---|---|---|---|---|---|---|---|---|---|---|
| Storage stability | ○ | ○ | ○ | ○ | ○ | ○ | ○ | ○ | — | X |
| Water resistance | ○ | ◎ | ◎ | ◎ | ○ | ○ | ○ | X | — | ○ |
| Solvent resistance | ○ | ◎ | ◎ | ◎ | ○ | ○ | ○ | X | — | ○ |

Examples 5 to 10

Waterborne curable resin compositions of Examples 5 to 10 were prepared in a similar procedure as Example 4 except that formulations were changed as shown in Table 3. Further, Diisocyanate (Trade name: BYHIDULE LS-2186; manufactured by Sumika Bayer Urethane Co., Ltd.) was added to the waterborne curable resin composition of Example 7. Further, storage stability was evaluated in a similar procedure as Example 4 using the resulted waterborne curable resin composition. Further, test pieces were prepared in a similar procedure as Example 4, water resistance and solvent resistance were evaluated. The results are shown in Table 4 above.

Comparative Examples 3 to 5

Test pieces were prepared in a similar procedure as Example 4 except that formulations were changed as shown in Table 3 and the waterborne curable resin compositions of Comparative Examples 3 to 5 were prepared. Further, storage stability was evaluated in a similar procedure as Example 4 using the resulted waterborne curable resin compositions. Further, test pieces were prepared in a similar procedure as Example 4, water resistance and solvent resistance were evaluated. The results are shown in Table 4 above. Further, the waterborne curable resin composition of Comparative Example 4 contains the carbodiimide compound A-4 in which the number of repeating unit of oxyalkylene group is lower than 6. Since the water dispersibility of the used carbodiimide compound A-4 is low, a waterborne curable resin composition for which evaluation can be carried out could not be obtained.

Example 11

Production of Waterborne Intermediate Coating Composition

After 12.5 parts (as a basis of the solid content) of a melamine resin (Trade Name; CYMEL 211, solid content=80% by mass, methoxy/butoxy ratio=65/35, water compatibility=8 mL/g, xylene compatibility>100 mL/g; manufactured by Nihon Cytec Industries Inc.) was mixed as a curing agent with 50 parts (as a basis of the solid content) of the coloring pigment paste obtained in Production Example 4, 27.5 parts (as a basis of the solid content) of the water dispersion type acryl resin composition obtained in Production Example 2 and 5 parts (as a basis of the solid content) of the water-soluble acryl resin obtained in Production Example 3, 0.3 part (as a basis of the solid content) of a urethane association type thickener (Trade Name; ADEKANOL UH814N, manufactured by ADEKA Corporation) was mixed and stirred to obtain a waterborne intermediate coating composition. The formulation of the resulted waterborne intermediate coating composition is shown in Table 5.

TABLE 5

| Contents | | Example 11 | Example 12 | Example 13 | Example 14 | Example 15 | Example 16 | Example 17 | Comparative Example 6 | Comparative Example 7 | Comparative Example 8 |
|---|---|---|---|---|---|---|---|---|---|---|---|
| Pigment | | 50 | 50 | 50 | 50 | 50 | 50 | 50 | 50 | 50 | 50 |
| Water dispersion type acryl resin | | 27.5 | 17.5 | — | — | 29.5 | 23.5 | 37 | 27.5 | 27.5 | 27.5 |
| Water-soluble acryl resin | | 5 | 5 | 5 | 5 | 5 | 5 | 6 | 5 | 5 | 5 |
| Curing agent combined emulsion | | — | — | 26.8 | 26.8 | — | — | — | — | — | — |
| Water dispersion type polyurethane composition | | — | 10 | 10 | 10 | — | — | — | — | — | — |
| Melamine resin | | 12.5 | 12.5 | 3.3 | — | 12.5 | 12.5 | — | 17.5 | 12.5 | 12.5 |
| Diisocyanate | | — | — | — | 3.3 | — | — | — | — | — | — |
| Urethane association type thickener | | 0.3 | 0.3 | 0.3 | 0.3 | 0.3 | 0.3 | 0.3 | 0.3 | 0.3 | 0.3 |
| Carbodiimide compound | A-1 | 5 | 5 | 5 | 5 | — | — | 7 | — | — | — |
| | A-2 | — | — | — | — | 3 | — | — | — | — | — |
| | A-3 | — | — | — | — | — | 9 | — | — | — | — |
| | A-4 | — | — | — | — | — | — | — | — | 5 | — |
| | A-5 | — | — | — | — | — | — | — | — | — | 5 |
| Total | | 100.3 | 100.3 | 100.4 | 100.4 | 100.3 | 100.3 | 100.3 | 100.3 | 100.3 | 100.3 |
| NV in coating composition | | 47 | 47 | 49 | 49 | 47 | 47 | 47 | 47 | — | 44 |

Formation of Multilayer Coating Film

A cationic electrodeposition coating composition (Trade name: POWER TOP U-50 manufactured by Nippon Paint Co., Ltd.) was applied by electrodeposition on a dull steel plate which had been treated with zinc phosphate so that the dried coating film is 20 μm, the applied coating was cured by heating at 160° C. for 30 minutes, and then cooled, and a steel plate substrate was prepared.

After the waterborne intermediate coating composition was applied by 20 μm by air spray application on the resulted substrate, and pre-heating was further carried out at 80° C. for 5 minutes, a waterborne metallic base coating composition (Trade name: AQUALEX AR-2000 Silver Metallic, manufactured by Nippon Paint Co., Ltd.) was applied by 15 μm by air application, and then preheating was carried out at 80° C. for 3 minutes. After an acid-epoxy curing type clear coating composition (Trade name: MACFLOW O-1800W-2 Clear, manufactured by Nippon Paint Co., Ltd.) was further applied by 35 μm by air spray application on the coated plate as a clear coating composition, curing by heating at 140° C. for 30 minutes was carried out to obtain a test piece on which a multilayer coating film was formed. Further, the waterborne intermediate coating composition, the waterborne metallic base coating composition and the clear coating composition were diluted under the conditions described below, and used for the coating. The concentration of non volatile content (in % by mass) (NV) of the waterborne intermediate coating composition after dilution is shown in Table 5.

Waterborne intermediate coating composition
Thinner: Deionized water
40 sec/No. 4 Ford cup/20° C.
Waterborne metallic base coating composition
Thinner: Deionized water
40 sec/No. 4 Ford cup/20° C.
Clear coating composition
Thinner: A mixed solvent of EEP (ethoxyethyl propionate)/aromatic hydrocarbon solvent (Trade Name; S-150, manufactured by EXXON Corporation)=1/1 (mass ratio)
30 Sec/No. 4 Ford cup/20° C.

Performance Evaluation of Waterborne Intermediate Coating Composition and Test Piece Storage stability was evaluated for the above-prepared waterborne intermediate coating composition. Further, the water resistance, coating film appearance and chipping resistance were evaluated using the above-prepared test piece.

Storage Stability

Firstly, the waterborne intermediate coating composition just after preparation was observed. Then, the waterborne intermediate coating composition after storage at 40° C. for 10 days was observed, and the storage stability was evaluated by comparing results of the observation with the observation results just after preparation. Evaluation basis is as follows.

○: Thickening and gelation were not observed in comparison with the waterborne intermediate coating composition just after preparation.

x: Thickening and gelation were observed in comparison with the waterborne intermediate coating composition just after preparation.

Water Resistance

A test piece was immersed in warm water at 40° C. for 10 days. Then, the appearance of the test piece rinsed for 1 hour was visually observed and evaluated according to the following basis. Further, if the evaluation result is ⊚ or ○, it is a level having no problem in practical use.

⊚: No change.

○: A portion immersed in warm water is slightly swollen but restores rapidly.

Δ: A portion immersed in warm water is slightly swollen but time is required for restoration.

x: A portion immersed in warm water is significantly swollen and very long time is required for restoration.

Coating Film Appearance: Wave Scan (SW Value)

Finishing appearance was evaluated by measuring the SW value of a test piece using a "Wave Scan" manufactured by Big Chemie Inc. Further, the SW value is an index for mainly evaluating gloss and fine skin and it is indicated that the lower the SW value is, the better the appearance is.

Chipping Resistance 300 of No. 7 crushed stones come into collision with a multilayer coating film of a test piece at an angle of 45° with air pressure of 0.29 MPa from a distance of 35 cm using a Gravelo tester (manufactured by Suga Test Instruments Co., Ltd.). After rinsing the test piece with water and drying the test piece, peeling test was carried out using a gum tape for industrial use manufactured by Nichiban Co., Ltd., and then, the degree of peeling of the coating film was visually observed and evaluated. Evaluation basis is as below. Further, if Evaluation result is "⊚" or "○", it is a level having no problem in practical use.

⊚: Peeling is hardly confirmed.

○: Peeling area is small and frequency is also little.

x: Peeling area is slightly large, or peeling area is large and frequency is also many.

The results are shown in Table 6.

TABLE 6

| Evaluation items | Example 11 | Example 12 | Example 13 | Example 14 | Example 15 | Example 16 | Example 17 | Comparative Example 6 | Comparative Example 7 | Comparative Example 8 |
|---|---|---|---|---|---|---|---|---|---|---|
| Storage stability | ○ | ○ | ○ | ○ | ○ | ○ | ○ | ○ | — | X |
| Water resistance | ○ | ⊚ | ⊚ | ⊚ | ○ | ○ | ○ | Δ | — | ○ |
| Coating film appearance (SW value by wave scan) | 9 | 8 | 7 | 7 | 8 | 8 | 7 | 17 | — | 10 |
| Chipping resistance | ○ | ⊚ | ⊚ | ⊚ | ○ | ○ | — | ○ | — | ○ |

Examples 12 to 17

Waterborne intermediate coating compositions of Examples 12 to 17 were prepared in a similar procedure as Example 11 except that formulations were changed as shown in Table 5. Further, storage stability was evaluated in a similar procedure as Example 11 for the prepared waterborne intermediate coating compositions. Further, test pieces were prepared in a similar procedure as Example 11, and the water resistance, coating film appearance and chipping resistance were evaluated. The results are shown in Table 6 above. Further, the evaluation of chipping resistance was not carried out for the waterborne intermediate coating composition of Example 17.

Comparative Examples 6 to 8

Waterborne intermediate coating compositions of Comparative Examples 6 to 8 were prepared in a similar procedure as Example 11 except that formulations were changed as shown in Table 5. Further, storage stability was evaluated in a similar procedure as Example 11 for the prepared waterborne intermediate coating compositions. Further, test pieces were prepared in a similar procedure as Example 11, and the water resistance, coating film appearance and chipping resistance were evaluated. The results are shown in Table 6 above. Further, it was impossible to prepare a coating composition by the waterborne intermediate coating composition of Comparative Example 7 because of its separation. Accordingly, the performance of the waterborne intermediate coating composition of Comparative Example 7 could not be evaluated.

The followings are appreciated from the results of Tables 2, 4 and 6.

As cleared from Table 2, the carbodiimide compounds according to Examples 1 to 3 exhibits good water dispersibility and storage stability. To the contrary, since the carbodiimide compound A-4 according to Comparative Example 1 has low HLB and is hydrophobic, the water dispersibility of the compound A-4 is inferior. Consequently, the storage stability of the carbodiimide compound A-4 could not be evaluated. Further, although the water dispersibility of the carbodiimide compound A-5 according to Comparative Example 2 exhibits good results, the storage stability of the compound A-5 is inferior in comparison with the carbodiimide compounds A-1 to A-3 according to Examples 1 to 3 respectively, since the compound A-5 has high HLB.

As cleared from Table 4, the waterborne curable resin compositions according to Examples 4 to 10 exhibit good storage stability and good water resistance. In particular, since the waterborne curable resin compositions according to Examples 5 to 7 contain the water dispersion type polyurethane composition, these compositions have more superior water resistance, respectively, even in comparison with those of Examples 4 and 8 to 10. To the contrary, since the waterborne curable resin composition according to Comparative Example 3 does not contain the carbodiimide compound, the composition cannot be perfectly cured at low temperature (100° C.), and the composition is inferior in the water resistance. The evaluation of the waterborne curable resin composition according to Comparative Example 4 could not be carried out as described above. Since the waterborne curable resin composition according to Comparative Example 5 contains the carbodiimide compound A-5 in which the number m of the repeating unit of $OR^1$ group is lower than 11, the storage stability of the composition is lowered in comparison with those of waterborne curable resin compositions according to Examples 4 to 6. Further, all of the waterborne curable resin compositions according to Examples 4 to 10 exhibit good solvent resistance.

As cleared from Table 6, the waterborne intermediate coating compositions according to Examples 11 to 17 have good results for both of storage stability and water resistance. Further, these waterborne intermediate coating compositions are superior in the coating film appearance. Particularly, the waterborne intermediate coating compositions according to Examples 11 to 16 have good chipping resistance. To the contrary, since the waterborne intermediate coating composition according to Comparative Example 6 does not contain the carbodiimide compound, water resistance is inferior. Further, the coating film appearance of the waterborne intermediate coating composition according to Comparative Example 6 is inferior in comparison with those of the waterborne curable resin compositions according to Examples 11 to 17. The evaluation of the waterborne intermediate coating composition according to Comparative Example 7 could not be carried out as described above. Since the waterborne intermediate coating composition according to Comparative Example 8 contains the carbodiimide compound A-5 in which the number m of the repeating unit of $OR^1$ group is lower than 11, the storage stability is lowered in comparison with those of the waterborne curable resin compositions according to Examples 11 to 17.

The present invention provides superior water resistance when it is applied to a waterborne coating composition, and the present invention provides useful carbodiimide compound having good storage stability and waterborne curable resin composition containing thereof, etc.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those skilled in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The disclosure of Japanese Patent Application No. 2005-337863 filed Nov. 22, 2005 including specification and claims is incorporated herein by reference in its entirety.

The invention claimed is:

1. A carbodiimide compound represented by the formula (I):

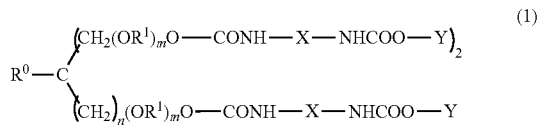

wherein X represents a bifunctional organic group containing at least one carbodiimide group, Y represents a structure in which a hydroxyl group is eliminated from a polyalkylene glycol monoalkyl ether, $R^0$ represents hydrogen or an alkyl group having 2 or less carbon atoms, $R^1$ represents an alkylene group having 4 or less carbon atoms, n represents 0 or 1 and m represents an integer of 11 or more, and wherein the repeating number of oxyalkylene group in the polyalkylene glycol monoalkyl ether is 6 to 40.

2. A waterborne curable resin composition comprising the carbodiimide compound according to claim 1 and a resin having a carboxyl group.

3. The waterborne curable resin composition according to claim 2, wherein the resin further has a hydroxyl group.

4. The waterborne curable resin composition according to claim 2, further comprising a melamine resin, an isocyanate resin or an oxazoline compound as a curing agent.

5. The waterborne curable resin composition according to claim 4, wherein the curing agent is a melamine resin.

6. The waterborne curable resin composition according to claim 2, wherein the resin having a carboxyl group is at least one resin selected from the group consisting of a waterborne polyurethane resin, a waterborne polyepoxy resin, a waterborne polyester resin and a waterborne acryl resin.

7. A waterborne intermediate coating composition, which is used for a method comprising formation of a multilayer coating film by simultaneously curing by heating an intermediate coating film, a waterborne base coating film and a clear coating film which have been formed on an article, in the order, by wet-on-wet and which are uncured, and which comprises the waterborne curable resin composition according to claim 2.

8. A method of using the waterborne curable resin composition according to claim 2 as a waterborne intermediate coating composition comprising forming a multilayer coating film by simultaneously curing by heating an intermediate coating film, a waterborne base coating film and a clear coating film which have been formed on an article, in the order, by wet-on-wet and which are uncured.

9. The waterborne curable resin composition according to claim 3, further comprising a melamine resin, an isocyanate resin or an oxazoline compound as a curing agent.

10. The waterborne curable resin composition according to claim 3, wherein the resin having a carboxyl group is at least one resin selected from the group consisting of a waterborne polyurethane resin, a waterborne polyepoxy resin, a waterborne polyester resin and a waterborne acryl resin.

11. The waterborne curable resin composition according to claim 4, wherein the resin having a carboxyl group is at least one resin selected from the group consisting of a waterborne polyurethane resin, a waterborne polyepoxy resin, a waterborne polyester resin and a waterborne acryl resin.

12. The waterborne curable resin composition according to claim 5, wherein the resin having a carboxyl group is at least one resin selected from the group consisting of a waterborne polyurethane resin, a waterborne polyepoxy resin, a waterborne polyester resin and a waterborne acryl resin.

13. A waterborne intermediate coating composition, which is used for a method comprising formation of a multilayer coating film by simultaneously curing by heating an intermediate coating film, a waterborne base coating film and a clear coating film which have been formed on an article, in the order, by wet-on-wet and which are uncured, and which comprises the waterborne curable resin composition according to claim 3.

14. A waterborne intermediate coating composition, which is used for a method comprising formation of a multilayer coating film by simultaneously curing by heating an intermediate coating film, a waterborne base coating film and a clear coating film which have been formed on an article, in the order, by wet-on-wet and which are uncured, and which comprises the waterborne curable resin composition according to claim 4.

15. A waterborne intermediate coating composition, which is used for a method comprising formation of a multilayer coating film by simultaneously curing by heating an intermediate coating film, a waterborne base coating film and a clear coating film which have been formed on an article, in the order, by wet-on-wet and which are uncured, and which comprises the waterborne curable resin composition according to claim 5.

16. A waterborne intermediate coating composition, which is used for a method comprising formation of a multilayer coating film by simultaneously curing by heating an intermediate coating film, a waterborne base coating film and a clear coating film which have been formed on an article, in the order, by wet-on-wet and which are uncured, and which comprises the waterborne curable resin composition according to claim 6.

17. A method of using the waterborne curable resin composition according to claim 3 as a waterborne intermediate coating composition comprising forming a multilayer coating film by simultaneously curing by heating an intermediate coating film, a waterborne base coating film and a clear coating film which have been formed on an article, in the order, by wet-on-wet and which are uncured.

18. A method of using the waterborne curable resin composition according to claim 4 as a waterborne intermediate coating composition comprising forming a multilayer coating film by simultaneously curing by heating an intermediate coating film, a waterborne base coating film and a clear coating film which have been formed on an article, in the order, by wet-on-wet and which are uncured.

19. A method of using the waterborne curable resin composition according to claim 5 as a waterborne intermediate coating composition comprising forming a multilayer coating film by simultaneously curing by heating an intermediate coating film, a waterborne base coating film and a clear coating film which have been formed on an article, in the order, by wet-on-wet and which are uncured.

20. A method of using the waterborne curable resin composition according to claim 6 as a waterborne intermediate coating composition comprising forming a multilayer coating film by simultaneously curing by heating an intermediate coating film, a waterborne base coating film and a clear coating film which have been formed on an article, in the order, by wet-on-wet and which are uncured.

* * * * *